3,154,563
PROCESS FOR THE REACTION OF ISOBUTENE WITH FORMALDEHYDE

Walter Krönig and Wolfgang Swodenk, Leverkusen, Germany, assignors to Farbenfabriken Bayer Aktiengesellschaft, Leverkusen, Germany, a corporation of Germany
No Drawing. Filed June 23, 1961, Ser. No. 119,053
Claims priority, application Germany June 29, 1960
10 Claims. (Cl. 260—340.7)

The reaction of isobutene with formaldehyde in the presence of catalysts leads to the formation of 4,4'-dimethyl-m-dioxane, this being a product which is of industrial importance because the splitting thereof leads to the formation of isoprene. This condensation reaction can be used with advantage with fractions which consist essentially of hydrocarbons with 4 carbon atoms (for example from the cracking of mineral oils) that is the so-called $C_4$-fractions. In these $C_4$-fractions, for example those from the pyrolysis of mineral oils, butadiene, isobutene and n-butenes and small quantities of butanes are contained as $C_4$-hydrocarbons. The butadiene can be isolated in known manner from this mixture, so that a $C_4$-fraction which consists predominantly of the butenes with small quantities of butanes is obtained. The conversion reaction with formaldehyde in the presence of catalysts generally proceeds in a selective manner, i.e. the formaldehyde reacts only with the isobutene with formation of the said dioxane, whereas the n-butenes do not enter into the reaction. By using the reaction which has been described, there is consequently obtained not only the dioxane which is valuable for further reactions, but this reaction has also the advantage to selectively remove the isobutene from the mixture of the butenes. Thus the n-butene is available for other uses in a form substantially free from isobutene.

For the reaction of the isobutene with the formaldehyde, which is used in aqueous solution, mineral acids, especially sulphuric acid are primarily used as catalysts. However, other mineral acids are also mentioned in the literature, such as hydrochloric acid, phosphoric acid, phosphotungstic acid and phosphomolybdic acid. The yields which are obtained when using these catalysts are satisfactory, but the process itself involves difficulties or disadvantages. One particular disadvantage is as follows:

The reaction is carried out by intimately mixing the formaldehyde solution containing sulphuric acid with the hydrocarbon mixture (the $C_4$-fraction) containing isobutene at temperatures in the region of 50 to 80° C., under such pressures that the $C_4$-fraction is present in a liquid phase. After completing the reaction, the two layers are separated from one another. A certain amount of the reaction product which forms (the dioxane) is found dissolved in the hydrocarbon layer, and this proportion of the reaction product can be increased if, when carrying out the reaction, the two phases are conducted in counter-current to one another. However, within the scope which is possible industrially, a substantial part of the dioxane always remains in the aqueous layer, since this product has a high water-solubility. The aqueous layer can therefore not be discarded as such, not only because of the loss of sulphuric acid which would be occasioned, but primarily, because of the untenable losses of dioxane. Considerable quantities of water are however constantly introduced into the reaction mixture with the aqueous formaldehyde supplied to the reaction. The sulphuric acid must be kept however at a certain concentration in the reaction chamber so that the necessary reaction may be effected. As a suitable concentration, is for example 20%. Now in order to compensate for the supply of water into the reaction, it is necessary for the sulphuric acid solution present after the reaction to be concentrated up to about 40%. Even when very great care is taken in this operation, i.e., for example, by working at low temperature, it is still not possible to prevent the sulphuric acid having a carbonising action on the organic products contained in the aqueous solution, so that the re-concentration of the sulphuric acid becomes impossible after a relatively short time and in addition the carbonaceous products in the sulphuric acid prevent a clear separation of the layers. In addition, working with sulphuric acid in the range from 20 to 40% leads to very strong corrosion, so that it is necessary to use for the apparatus materials which are technically difficult to handle. Similar considerations also apply as regards the other mineral acids which have been mentioned.

It has now been found that when reacting isobutene with formaldehyde to form 4,4-dimethyldioxane, it is possible to operate with a reaction velocity which is adequate for industrial purposes by working in the presence as catalysts of cation exchangers which contain sulphonic acid groups and which are based on cross-linked aromatic vinyl polymers.

Cation exchangers which have been obtained by polymerisation or copolymerisation of aromatic vinyl compounds which can contain sulphonic acid groups and which are, if necessary subjected to subsequent sulphonation are preferably used for the new process.

The following aromatic vinyl compounds may be mentioned as compounds which are suitable for the production of the polymers or copolymers: Styrene, vinyl toluenes, vinyl naphthalenes, vinyl ethyl benzenes, methyl styrenes, vinyl chlorobenzenes and vinyl xylenes. Various methods can be used for the production of these polymers, such as for example, polymerisation alone or in admixture with other monovinyl compounds, and also cross-linking with polyvinyl compounds, such as divinyl benzenes, divinyl toluenes, divinyl phenyl ethers and other compounds. The polymers may be prepared in the presence or absence of solvents or dispersing agents if desired using various polymerisation initiators, such as inorganic or organic peroxides, persulphate and other initiators.

The introduction of the sulphonic acid groups into these aromatic vinyl polymers can be effected by various methods known for this purpose, for example by sulphonation of the polymers with concentrated sulphuric acid or chlorosulphonic acid or if desired copolymerisation of copolymerisable aromatic compounds which carry sulphonic acid groups (see for example U.S. Patent No. 2,366,007).

Furthermore, more sulphonic acid groups can be introduced into polymers which already contain sulphonic acid groups by a treatment with oleum, i.e. sulphuric acid containing sulphur trioxide. The treatment with the oleum is advantageously carried out at 0–150° C. and the sulphuric acid containing sulphur trioxide should contain such a quantity of the latter that the sulphonating acid still contains between 10 and 50% of free sulphur trioxide after completion of the sulphonation. The products obtained advantageously contain an average of 1.3 to 1.8 sulphonic acid groups per aromatic nucleus.

Especially suitable for the process according to the invention are copolymers which contain sulphonic acid groups and which are derived from aromatic monovinyl compounds and aromatic polyvinyl compounds, more especially divinyl compounds, in which the proportion of aromatic polyvinyl compound is preferably 1–15, particularly 2–10% by weight of the copolymer (see German Patent No. 908,247).

It may be of advantage to employ fine-grain ion exchangers, for example those with a grain size of 0.1 to 500μ, preferably 20 to 200μ. A fine grain size is advantageously used when the divinyl benzene content of the copolymer is high.

About 0.2 to 20, advantageously 1 to 15, parts by weight of the said ion exchangers can be used e.g. per 100 parts by weight of the mixture of isobutene and formaldehyde (both calculated as being 100%).

It is important for carrying out the reaction to ensure a thorough mixing of the aqueous phase with the phase which contains hydrocarbons. The conventional stirrer-type containers are suitable for this purpose, but closed tubes with an inlet and outlet, in which tubes the contents are circulated at such a speed that a thorough mixing of the phases occurs may also be used. It is advisable to ensure that the movement of the contents of the reactor has the least possible comminuting action on the catalyst.

It has been found advantageous to arrange that several (for example 4 to 8) of such reaction containers are connected in series, it being possible to work with unidirectional flow or counter-current flow. When operating in unidirectional flow the separation of the layers (aqueous layer and hydrocarbon layer) is only effected at the end of the reaction sequence. When operating in counter-current, a settling vessel is arranged after each reaction container, the separation between the phases taking place in the said vessel and the arrangement is so chosen that the aqueous phase and the hydrocarbon phase travel through the sequence of reactors in counter-current. It is found in this case that the solid catalyst remains almost completely in the aqueous phase in the settling vessels. When using the counter-current principle, the solid catalyst travels with the aqueous phase through the series of reactors, while the hydrocarbon phase only comes into intimate contact with the solid catalysts in the reactors themselves. After passing through the sequence of reactors, a concentration of the solid catalyst in the aqueous phase is effected, either by settlement in stabilisation vessels, or by the known hydro-cyclones or by centrifuging or filtering. The enriched catalyst is then returned to the reactor series and as much catalyst as is necessary for maintaining the required activity is replaced. Whereas the reconcentration of the catalyst, when using aqueous mineral acids, must be effected by evaporation, which is complicated and difficult to carry out, the reconcentration of the catalyst in the present case is effected by a simple mechanical separation process, by which no carbonaceous substances can be formed. After removal of the catalyst, the reaction products dissolved in the aqueous phase can be recovered therefrom in known manner, whereas the reaction products can be obtained for further processing from the hydrocarbon phase by evaporating off the $C_4$-hydrocarbons. The distillation of the aqueous phase after removal of the solid catalyst does not present any difficulties and, in direct contrast to the known sulphuric acid process, no carbonisation of the substances contained in the aqueous reaction product takes place in this case. In this way, the new process overcomes one of the most important difficulties of the known sulphuric acid process.

Temperatures of 50 to 120° C. and advantageously 80 to 100° C., are used in the reaction chamber and the pressure therein is so chosen that it is somewhat higher than the vapour pressure of the hydrocarbons at the reaction temperature, so that no evaporation occurs in the reactors. The pressures are generally in the range from 10 to 20 atm.

$C_4$-fractions from thermal or catalytic cracking processes or the conversion of hydrocarbons are e.g. suitable as starting materials, in particular mixtures of isobutene, n-butenes and butanes with an isobutene concentration between 10 and 60% by weight. However, the reaction referred to can also be carried out with $C_4$-fractions having a substantially higher isobutene content. Where the $C_4$-fraction which is available contains butadiene, this should be removed beforehand, for example by selective extraction. The $C_4$-fractions can contain relatively small quantities of other hydrocarbons, for example $C_3$ or $C_5$-hydrocarbons. The hydrocarbon mixture to be used and the formalin solution must be practically free from metal compounds, more especially metal ions, and also from basic constitutents, for example ammonia and organic amines, as well as other compounds which are able to react with the solid catalyst containing sulphonic acid groups.

It has been found to be particularly advantageous for diolefines and acetylenes to be removed as far as possible from the hydrocarbon mixture which is to be used. Preferably the diolefine content should be lowered to below 0.1% by weight and the content of acetylenes to below 0.01% by weight. This precautuion reduces considerably the possibility of damage to the ion exchanger during the reaction and thus substantially increases its effective life. In order to remove disturbing impurities (diolefins, acetylenes), selective hydrogenation of the $C_4$-fraction in the liquid phase is particularly suitable.

It is almost exclusively the isobutene which is reacted with the process according to the invention, while the n-butenes do not in practice participate in the reaction. It is thus possible with this process to achieve a separation between isobutene and n-butenes. The reaction of the isobutene can be allowed to proceed until practically the entire isobutene is used up, but smaller conversions, for example half of the isobutene which is present, can also be effected, if it is desired to use the residual isobutene in the mixture for other purposes. A somewhat better selectivity is produced with the smaller conversions.

An important advantage of the process according to the invention over the sulphuric acid process consists in, which is to be emphasised, that it is not necessary with the present process to handle the very corrosive dilute sulphuric acid and that thus the difficulties which occur regarding selection of materials used for the apparatus wherein the process is carried out are in this case proportionately smaller than with the sulphuric acid process.

An additional advantage which is to be emphasized is that, in contrast to the sulphuric acid process, it is not necessary to work with large quantities of hydrocarbons, i.e. with corresponding dilution of the $C_4$-fraction containing isobutene, but that it is possible in this case to carry out the reaction with any desired concentration of isobutene in the $C_4$-fraction. This considerably simplifies the working up of the hydrocarbon product. When using the sulphuric acid process, it is necessary to work with quite considerable dilutions of the aqueous phase with water in order to effect a concentration of the sulphuric acid after the reaction in a range in which the carbonisation of the organic substance is at least still kept within certain limits. This restriction does not apply with the present process, since as already mentioned, the reconcentration of the catalyst can be carried out purely mechanically and in addition the distillation of the aqueous layer after removing the catalyst does not present any difficulties. Concurrently with the reaction of isobutene to dimethyldioxane, there also occurs the hydration of isobutene to tertiary butanol. The extent of this concurrent reaction can be varied within quite wide limits, depending on the ratio used between formaldye and isobutene. For example, the following quantities of tertiary butanol are obtained to 100 parts by weight of dimethyldioxane:

| Charge: Mols formaldehyde to 100 mols isobutene | 50 | 200 | 400 |
|---|---|---|---|
| Parts by weight tertiary butanol per 100 parts by weight dimethyldioxane | 83 | 19 | 16 |

With the splitting of the dimethyldioxane to isoprene, the tertiary butanol is simultaneously split to form isobutene, and an isobutene is in fact obtained of a very high purity. Where there is no demand for this isobutene, it can be returned into the process for the production of the dimethyldioxane.

Example 1

105 g. of 30% formalin solution and 150 g. of a $C_4$-fraction having the following composition:

| | Percent |
|---|---|
| Isobutene | 20 |
| Butanes | 18 |
| n-Butenes | 62 | are introduced into a stirrer-type autoclave. 5 g. of dry cation exchanger containing sulphonic acid groups and based on polystyrene, cross-linked with 2% by weight of divinyl benzene (prepared by the process described in German Patent No. 908,247, by treating a styrene-divinyl benzene copolymer with chlorosulphonic acid until the polymerisation product contains on average 1.5 sulphonic acid groups to each aryl nucleus) with a gain size of 100 to $200\mu$ are added to this mixture. The contents of the autoclave are heated to 100° C. for 1 hour with stirring. After cooling, the aqueous phase (which contains the catalyst) is separted from the hydrocarbon phase. The unreacted $C_4$-hydrocarbons are driven off from the hydrocarbon phase and there then remains as residue a mixture consisting of the reaction products, mainly dimethyldioxane. From the aqueous phase, the 4,4-dimethyl-m-dioxane is concentrated by azeotropic distillisation. From the two phases, there are obtained altogether 47 g. of dimethyl-dioxane including small quantities of enols and diols as well as 8 g. of tertiary butanol.

Example 2

208 g. of a 15.2% formalin solution and 100 g. of a $C_4$-fraction with the following composition:

| | Percent |
|---|---|
| Isobutene | 31 |
| Butanes | 15 |
| n-Butenes | 54 | are introduced into a stirrer-type autoclave. 5 g. of dry cation exchanger containing sulphonic acid groups and based on polyvinyl toluene, cross-linked with 6% by weight of divinyl benzene, with a grain size of 50 to $100\mu$ are added to this mixture. The contents of the autoclave are heated to 100° C. for 1 hour with stirring and, after cooling, the aqueous phase is separated from the hydrocarbon phase. The unreacted hydrocarbons are driven off from the upper phase and the catalyst is removed by centrifuging from the lower phase. From the two phases, there are obtained:

43 g. of dimethyldioxane, including relatively small quantities of enols and diols and 6 g. of tert-butanol.

9 g. of formaldehyde have not been reacted and are to be found in the aqueous phase.

The cation exchanger was obtained in the following manner:

The polyvinyl toluene cross-linked with 6% by weight of divinyl benzene was mixed with half the quantity of ethylene chloride to soften it. Three times the quantity of sulphuric acid were then added and heated while stirring for 3 hours to 120° C. After 4 hours, the product was cooled to 80° C. and approximately 3 times the quantity of 65% oleum was gradually added. The mixture was kept for some time at 100° C. allowed to cool and water was slowly added. The cation exchanger contained an average of 1.8 sulphonic acid groups for each aryl nucleus.

Example 3

208 g. of a 15% formalin solution and 96 g. of a $C_4$-fraction (32% isobutene content) are introduced into a stirrer-type autoclave.

6 g. of a dry cation exchanger containing sulphonic acid groups, which exchanger was prepared according to Example 2 on a basis of polystyrene, cross-linked with 2% by weight of divinyl benzene, and having a grain size of 100 to $250\mu$ is then added to this mixture. The contents of the autoclave are heated for 30 minutes with stirring to 110° C. and, after cooling, the aqueous phase is separated from the hydrocarbon phase. The unreacted hydrocarbons are driven off from the aqueous phase, from which the catalyst is also removed by filtration. From the two phases, there are obtained 44 g. of 4,4-dimethyl-m-dioxane, including relatively small quantities of enols and diols as well as 5 g. of tert.-butanol. 8 g. of formaldehyde are not reacted and are to be found in the aqueous phase.

Example 4

Into a reactor series comprising 6 stirrer-type vessels each with a capacity of 10 litres, there are introduced in unidirectional flow:

20.2 kg./h. of a 14.8% formalin solution,
18.5 kg./h. of a $C_4$-fraction having the following composition:

| | Percent |
|---|---|
| Isobutene | 32 |
| n-Butenes | 60 |
| Butanes | 8 | and also 0.5 kg./h. of a centrifuge-dry cation exchanger containing an average of 1.4 sulfonic acid groups to each aryl nucleus, the said exchanger being based on polystyrene cross-linked with 4% by weight of divinyl benzene and having a grain size of 10 to $200\mu$. The temperature in the vessels is kept at 100° C. and the pressure is 20 atm.

The product leaving the last vessel is separated in a separating vessel into the hydrocarbon phase and the aqueous phase.

The cation exchanger is removed from the aqueous phase by centrifugation and returned to the reactor series. The aqueous phase still contains 0.27 kg./h. of unreacted formalin, as well as relatively small quantities of tert.-butanol and 4,4-dimethyl-m-dioxane.

The hydrocarbon phase is introduced into a distillation column, from the head of which there are removed 14.2 kg./h. of a $C_4$-fraction (containing 11% of isobutene). In the sump of the column, and also in the aqueous phase, there are contained 5.1 kg./h. of 4,4-dimethyl-m-dioxane, including relatively small quantities of enols and diols, and also 1.8 kg./h. of tert.-butanol.

With the splitting of this dimethyldioxane-butanol mixture, 44 parts of isobutene are formed to 100 parts of isoprene.

We claim:

1. A process for the preparation of 4,4-dimethyldioxane wherein isobutene and formaldehyde are condensed in the presence of an acidic cation-exchange resin catalyst consisting essentially of a cross linked aromatic vinyl polymer containing nuclearly substituted sulfonic acid groups.

2. The process of claim 1 wherein the number of sulfonic acid groups in said cation-exchange resin is increased by treating the resin with oleum at temperatures of 0–200° C.

3. The process of claim 1 wherein said cation-exchange resin is a copolymer of a monovinyl aromatic monomer and 1–15% by weight, based on the weight of the copolymer, of a polyvinyl aromatic monomer.

4. The process of claim 3 wherein said cation-exchange resin is prepared by the copolymerization of a monomer selected from the group consisting of styrene and vinyl toluene with 1–15% by weight of divinyl benzene, based on the weight of the copolymer.

5. The process of claim 1 wherein the catalyst consists essentially of a polystyrene cation-exchange resin cross-linked with divinyl benzene and containing nuclearly substituted sulfonic acid groups, the condensation reaction being conducted at a temperature of about 100° C.

6. The process of claim 1 wherein the catalyst is employed in an amount of 1–15 parts by weight per 100 parts by weight of the mixture of isobutene and formaldehyde, the said mixture being considered as 100% pure.

7. The process of claim 1 wherein the reaction between isobutene and formaldehyde is conducted at a temperature of 50–120° C.

8. The process of claim 5 wherein said reaction is conducted at a pressure of 10–20 atmospheres so that no evaporation occurs in the reactors.

9. The process of claim 1 wherein the catalyst is separated from the system after the termination of the reaction and is partially returned to said system.

10. An improved process for the preparation of 4,4-dimethyldioxane from isobutene and formaldehyde which comprises reacting isobutene and formaldehyde in a plurality of series-connected thoroughly stirred vessels employing unidirectional flow and also employing as the catalyst therein a cross-linked aromatic vinyl polymer containing nuclearly substituted sulfonic acid groups.

References Cited in the file of this patent

UNITED STATES PATENTS

| | | |
|---|---|---|
| 2,721,223 | Arundale et al. | Oct. 18, 1955 |
| 2,997,480 | Hellin et al. | Aug. 22, 1961 |
| 3,000,905 | Wheeler et al. | Sept. 19, 1961 |

OTHER REFERENCES

Andric: "Ann. Chim." Paris, vol. 5, pages 1373–408 (1960).